US012646996B2

(12) United States Patent (10) Patent No.: US 12,646,996 B2

Dehez et al. (45) Date of Patent: Jun. 2, 2026

---

(54) ELECTRIC MACHINE WITH AN ELECTROMAGNETIC BEARING

(71) Applicant: UNIVERSITE CATHOLIQUE DE LOUVAIN, Louvain-la-Neuve (BE)

(72) Inventors: Bruno Dehez, Louvain-la-Neuve (BE); Joachim Van Verdeghem, Louvain-la-Neuve (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 175 days.

(21) Appl. No.: 18/573,008

(22) PCT Filed: Jun. 28, 2022

(86) PCT No.: PCT/EP2022/067804

§ 371 (c)(1),
(2) Date: Dec. 21, 2023

(87) PCT Pub. No.: WO2023/275096

PCT Pub. Date: Jan. 5, 2023

(65) Prior Publication Data

US 2024/0372436 A1 Nov. 7, 2024

(30) Foreign Application Priority Data

Jun. 28, 2021 (EP) ..................................... 21182211

(51) Int. Cl.
*H02K 7/09* (2006.01)
*F16C 32/04* (2006.01)

(52) U.S. Cl.
CPC .......... *H02K 7/09* (2013.01); *F16C 32/0436* (2013.01); *F16C 32/0451* (2013.01); *F16C 2380/26* (2013.01)

(58) Field of Classification Search
CPC ... H02K 7/09; F16C 32/0436; F16C 32/0451; F16C 2380/26; F16C 2233/00; F16C 2300/22; F16C 2316/18; F16C 32/0442
See application file for complete search history.

(56) References Cited

U.S. PATENT DOCUMENTS

| | | | |
|---|---|---|---|
| 5,469,006 A | * | 11/1995 | Pinkerton ........... F16C 32/0436 |
| | | | 310/90.5 |
| 10,780,408 B2 | | 9/2020 | Schöb et al. |
| 2017/0007973 A1 | * | 1/2017 | Schöb ....................... H02K 5/18 |

FOREIGN PATENT DOCUMENTS

| | | | |
|---|---|---|---|
| EP | 1596080 A1 | * 11/2005 | .......... F16C 32/0442 |
| EP | 1942283 A2 | 7/2008 | |

(Continued)

OTHER PUBLICATIONS

English translation of JP-2000087967-A (Year: 2000).*

(Continued)

*Primary Examiner* — Tulsidas C Patel
*Assistant Examiner* — Joshua Kiel M Rodriguez
(74) *Attorney, Agent, or Firm* — KARCESKI IP LAW, PLLC

(57) ABSTRACT

An electric machine includes a rotor and a stator. The stator includes a pair of windings positioned symmetrically with respect to the rotor, such that a displacement of the rotor causes an increase of magnetic flux in one winding and a decrease in the other. A driver operates the machine in either an active or a passive electromagnetic bearing mode. In the active mode, the driver applies a suspension signal to at least one winding of the pair to generate a suspension force on the rotor. In the passive mode, the driver interconnects the pair of windings. This interconnection allows displacement-induced flux changes to generate a suspension current in the windings. The suspension current, in turn, produces a mag- (Continued)

netic field that exerts a restoring force on the rotor, counteracting the displacement.

14 Claims, 6 Drawing Sheets

(56) References Cited

FOREIGN PATENT DOCUMENTS

| | | | |
|---|---|---|---|
| JP | 2000087967 A | * | 3/2000 |
| JP | 2004132537 A | | 4/2004 |
| JP | 6628388 B2 | | 1/2020 |

OTHER PUBLICATIONS

English translation of EP-1596080-A1 (Year: 2005).*
International Search Report and Written Opinion dated Aug. 24, 2022, for International Patent Application No. PCT/EP2022/067804.

* cited by examiner

1100

1101

1102

1103

1104

1105

ELECTRIC MACHINE WITH AN ELECTROMAGNETIC BEARING

CROSS-REFERENCE TO RELATED APPLICATION(S)

This is a National Stage Entry into the United States Patent and Trademark Office from International Patent Application No. PCT/EP2022/067804, filed on Jun. 28, 2022, which relies on and claims priority to European Patent Application No. 21182211.9, filed on Jun. 28, 2021, the entire contents of both of which are incorporated herein by reference.

FIELD OF THE INVENTION

An aspect of the invention relates to an electric machine provided with an electromagnetic bearing. The electric machine may find applications in, for example, ventricular assist devices, blowers and fans, reaction wheels, flywheels, pumps, and so-called high purity devices, as well as other electromechanical systems. Other aspects of the invention relate an electromechanical system, and a method of operating an electric machine provided with an electromagnetic bearing.

BACKGROUND ART

An electric machine may comprise a rotor and a stator that jointly form a motor or a generator. A magnetic field may emanate from the rotor. This electric magnetic field may be produced by, for example, one or more magnetic pole pairs. A permanent magnet may provide such a magnetic pole pair. The stator may also produce a magnetic field, for example, in response to a drive signal that is applied to one or more windings in the stator. The magnetic field produced by the stator may thus interact with the magnetic field emanating from the rotor. In an electric motor, this interaction exerts a torque on the rotor, which makes the rotor spin. The drive signal may determine a rotational speed at which the rotor spins as well as the torque that is exerted on the rotor. In an electric generator, the torque is opposite in sign with respect to the rotation speed.

An electric machine as described hereinbefore may be provided with an electromagnetic bearing. To that end, the drive signal that is applied to the stator may comprise a suspension component, which makes that the magnetic field produced by the stator has a suspension component too. The suspension component of the magnetic field exerts a suspension force on the rotor through interaction with the magnetic field emanating from the rotor. The suspension component in the drive signal, which provides the suspension force, is controlled so as to correct a measured deviation of an actual position of the rotor from a desired position. One or more other measured operational parameters may also be used for controlling the suspension component, which provides the electromagnetic bearing. Further, a desired stiffness and damping of the electromagnetic bearing may be obtained by controlling the suspension component in an appropriate manner.

An electric machine provided with an electromagnetic bearing has various advantages compared with an electrical machine provided with a mechanical bearing. An electromagnetic bearing is free from mechanical friction and thus free from mechanical wear. Moreover, energy losses, if any, are typically considerably lower than in a mechanical bearing. In turn, this allows higher operating efficiency. Further, an electric machine provided with an electromagnetic bearing can be more compact than an electrical machine provided with a mechanical bearing. An electromagnetic bearing needs no lubrication, which contributes to ease of use and maintenance. Moreover, this avoids that a lubricant contaminates an environment in which an electrical machine operates. These advantages make that an electrical machine provided with an electromagnetic bearing is particularly suited for applications where high torque density is required, or high spin speed, or high purity, or compactness, or any combination of these.

Patent publication JP6628388B2 is a background art example of an electric motor provided with an electromagnetic bearing, which is referred to as bearingless motor. The bearingless motor described in this publication comprises a rotor and a stator that supports, by a magnetic force, only one end in a rotation shaft direction of the rotor. The rotor has a shaft member magnetized in the rotation shaft direction. A plurality of motor magnets are arranged along an outer periphery of the shaft member. The stator has a hollow-shaped shaft member magnetized in the rotation shaft direction. The hollow-shaped shaft member of the stator houses at least a part of the shaft member of the rotor therein, as well as a plurality of coils opposed to the motor magnets in the rotation shaft direction. These coils are divided and provided along an outer periphery of the hollow-shaped shaft member of the stator.

SUMMARY OF THE INVENTION

There is a need for an electric machine with an electromagnetic bearing that allows improvement in at least one of the following aspects: reliability, compactness, spin speed range, ease of design and ease of manufacture.

The invention takes the following into consideration. In an electric machine provided with an electromagnetic bearing as described hereinbefore, controlling the suspension current may be relatively complex and prone to malfunction. This may particularly be the case if the rotor spins at relatively high speeds due to, for example, inaccuracies in rotor angular position measurement. What is more, in case there is a malfunction, the rotor may break away from its desired position and crash, as it were, against the stator, or another structural component of the electric machine. In order to prevent such a damaging incident, mechanical safety bearings may be provided. However, this solution will not prevent a relatively "stressful" transient event for the rotor and these bearings. This is because there will generally be a significant speed difference between the rotor and the safety emergency bearings, which are typically stationary, when these come into contact. This "stress" may make that the mechanical safety bearings need to be replaced after a few hard landings of the rotor.

An aspect of the invention provides for an electric machine provided with an electromagnetic bearing, the electric machine comprising:
  a rotor from which a magnetic field emanates;
  a stator adapted to produce a magnetic field that interacts with the magnetic field emanating from the rotor; and
  a driver adapted to operate in an active electromagnetic bearing mode in which the driver applies a suspension signal component to the stator that causes the magnetic field produced by the stator to have a component that exerts a suspension force on the rotor through interaction with the magnetic field emanating from the rotor,
    wherein the stator comprises a pair of windings symmetrically positioned with respect to the rotor so that a displacement of the rotor causes an increase in magnitude of a magnetic flux induced by the rotor in one winding of the pair of windings and a decrease in magnitude of a magnetic flux induced by the rotor in the other winding of the pair of windings, and wherein the driver is further adapted to operate in a passive electromagnetic bearing mode in which the driver interconnects the pair of windings of the stator with each other so that the increase in magnitude of the magnetic flux in the one winding and the corresponding decrease in magnitude in the other winding of the pair of windings generates a suspension current in the pair of windings that causes the magnetic field produced by the stator to have a component that exerts a restoring force on the rotor counteracting the displacement.

A further aspect of the invention provides for an electromechanical system comprising an electric machine as defined hereinbefore.

Yet a further aspect of the invention provides for a method of operating an electric machine provided with an electromagnetic bearing, the electric machine comprising:

a rotor from which a magnetic field emanates; and a stator adapted to produce a magnetic field that interacts with the magnetic field emanating from the rotor, the stator comprising a pair of windings symmetrically positioned with respect to the rotor so that a displacement of the rotor causes an increase in magnitude of a magnetic flux induced by the rotor in one winding of the pair of windings and a decrease in magnitude of a magnetic flux induced by the rotor in the other winding of the pair of windings, the method comprising selectively operating a driver in one of the following two modes:

an active electromagnetic bearing mode in which the driver applies a suspension signal component to the stator that causes the magnetic field produced by the stator to have a component that exerts a suspension force on the rotor through interaction with the magnetic field emanating from the rotor; and a passive electromagnetic bearing mode in which the driver interconnects the pair of windings of the stator with each other so that the increase in magnitude of the magnetic flux in the one winding and the decrease in magnitude in the other winding of the pair of windings generates a suspension current in the pair of windings that causes the magnetic field produced by the stator to have a component that exerts a restoring force on the rotor counteracting the displacement.

In each of these aspects, the restoring force exerted on the rotor in the passive electromagnetic bearing mode is a substitute of the suspension force exerted on the rotor in the active electromagnetic bearing mode, both these forces concerning a same degree of freedom of the rotor. The restoring force provided in the passive electromagnetic bearing mode allows a relatively safe and soft landing of the rotor in case there is a malfunction. This is because the passive electromagnetic bearing mode need not rely on any active control, which is inherently prone to malfunction, in order to keep the rotor in a suspended state, free from contact with the stator, or with another structural component of the electric machine.

In order to keep the rotor in the suspended state, the passive electromagnetic bearing mode may require that the rotor spins at a speed that is above a threshold speed. Thus, the rotor may still land on the stator, or a safety bearing, or another structural component, but spinning at a speed that is below the threshold speed. This speed may be sufficiently low to ensure a relatively safe landing. Moreover, while the rotor slows down, gradually spinning at a lower speed, the restoring force will gradually become weaker making that the rotor will gradually move towards the structural component on which the rotor will eventually land. In contrast, in the active electromagnetic bearing mode, the suspension force may abruptly disappear making that the rotor may have a crash landing. The safe and soft landing that the passive electromagnetic bearing mode can provide thus allows less mechanical stress, wear, or even damage. Accordingly, the invention allows an improvement in reliability.

What is more, the passive electromagnetic bearing mode can be used for keeping the rotor in the suspended state at relatively high spin speeds, that is, speeds that are above the aforementioned threshold speed. Accordingly, the active electromagnetic bearing mode need not cope with these relatively high spin speeds. This may simplify design and manufacture of circuitry involved in the active electromagnetic bearing mode, which circuitry typically includes sensors and controllers. Accordingly, the invention allows an improvement in ease of design and manufacture and, therefore, lower cost. This may further allow improvement in compactness. What may further contribute to ease of design and manufacture, as well as compactness, is that mechanical safety bearings may not be required, or, at least, may be simpler, smaller or cheaper, or any combination of these, than the mechanical safety bearings required in conventional electric machines with an active electromagnetic bearing only.

The electrical machine as defined hereinbefore may satisfactorily operate over a relatively wide spin speed range. As indicated hereinbefore, the passive electromagnetic bearing mode may be used in a high spin speed range, which may start at the aforementioned threshold speed of this mode, or somewhat above this threshold speed. The high spin speed range may end at a relatively high maximum spin speed, which, in principle, is not imposed by constraints relating to active control. The active electromagnetic bearing mode may be used in a relatively low spin speed range, which is traversed, for example, in a start-up phase or in an end-phase. Moreover, it has been found that switching between the passive electromagnetic bearing mode and the active electromagnetic bearing mode need not produce unacceptable transient effects. Moreover, these transient effects can be mitigated without requiring complex elements.

For the purpose of illustration, some embodiments of the invention are described in detail with reference to accompanying drawings. In this description, additional features will be presented, some of which are defined in the dependent claims, and advantages will be apparent.

DESCRIPTION OF EMBODIMENT(S) OF THE INVENTION

Figure 1:
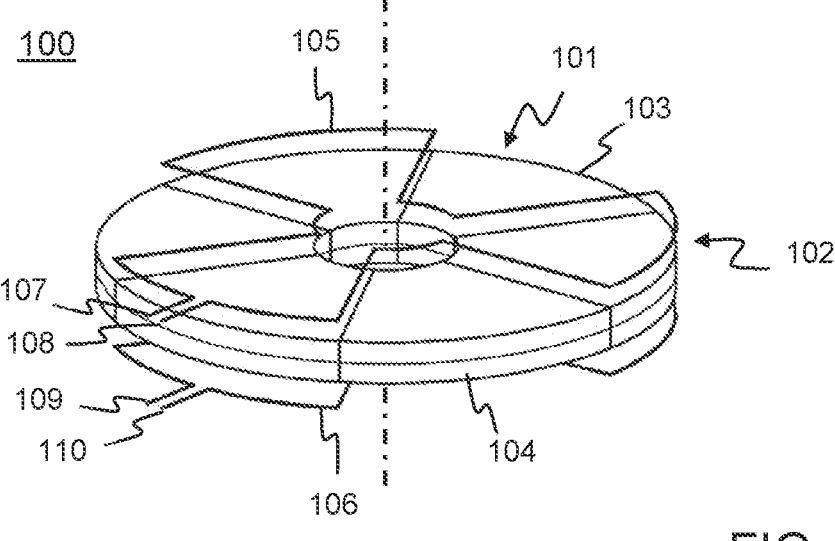
FIG. 1 is a simplified schematic perspective view of an electric motor having an axial flux configuration.

FIG. 1 schematically illustrates an example of an electric motor 100 having an axial flux configuration. FIG. 1 provides a simplified schematic perspective view of the electric motor 100 in this configuration. The electric motor 100 comprises a rotor 101 from which an axially oriented magnetic field emanates. The electric motor 100 further comprises a stator 102 that can produce an axially oriented magnetic field. These axially oriented magnetic fields may interact with each other. The electric motor 100 may further comprise a pair permanent magnet centering bearings between which the rotor 101 and stator 102 are sandwiched. These permanent magnet centering bearings are not represented in FIG. 1 for the sake of simplicity.

In this embodiment, the rotor 101 is in the form of a disk-like permanent magnet structure that comprises three magnetic pole pairs. The disk-like permanent magnet structure has two main sides 103, 104, which are axially oriented. The two main sides 103, 104 will individually be referred to as upper main side 103 and lower main side 104 for the sake of convenience.

The stator 102 comprises a pair of axially oriented windings 105, 106, which is axially aligned with the rotor 101 as illustrated in FIG. 1. The windings 105, 106 will individually be referred to as upper winding 105 and lower winding 106 for the sake of convenience. The upper winding 105 axially faces the upper main side 103 of the rotor. The lower winding 106 axially faces the lower main side 104. The upper winding 105 has a pair of terminals 107, 108 through which the upper winding 105 can receive an electrical signal and provide an electrical signal. The terminals 107, 108 will individually be referred to as left terminal 107 and right terminal 108 for the sake of convenience. The lower winding 106 also has such a pair of terminals 109, 110. These terminals will also individually be referred to as left terminal 109 and right terminal 110 for the sake of convenience.

Figure 2:
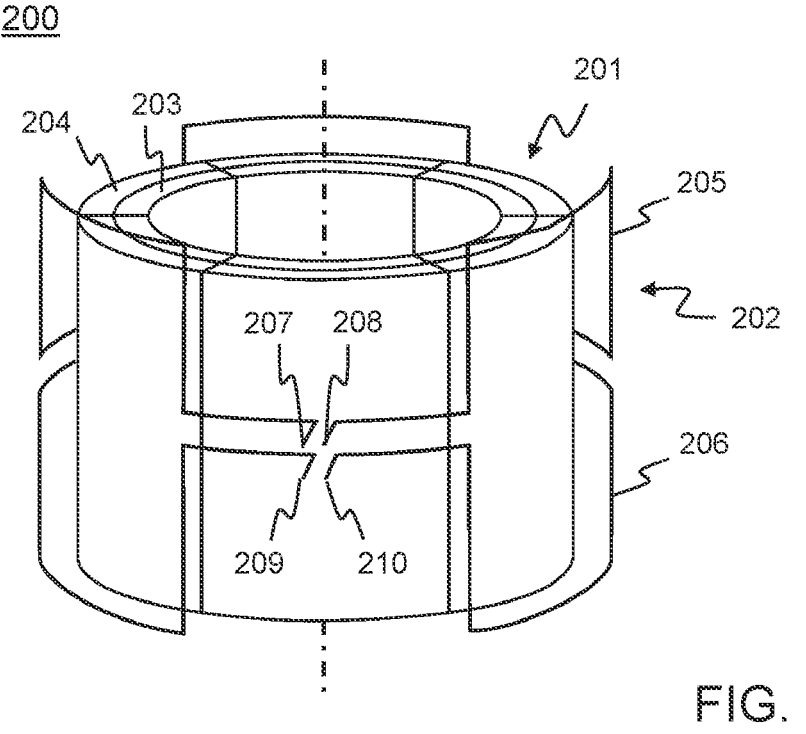
FIG. 2 is a simplified schematic perspective view of an electric motor having a radial flux configuration.

FIG. 2 schematically illustrates an example of an electric motor 200 having a radial flux configuration. FIG. 2 provides a simplified schematic perspective view of the electric motor 200 in this configuration. The electric motor 200 comprises a rotor 201 from which a radially oriented magnetic field emanates. The electric motor 200 further comprises a stator 202 that can produce a radially oriented magnetic field. These radially oriented magnetic fields may interact with each other. Here too, the electric motor 200 may further comprise a pair permanent magnet centering bearings between which the rotor 201 and stator 202 are sandwiched. These permanent magnet centering bearings are not represented in FIG. 2 for the sake of simplicity.

In this embodiment, the rotor 201 is in the form of a cylinder-like permanent magnet structure that comprises three magnetic pole pairs. The cylinder-like permanent magnet structure has two main sides 203, 204, which are radially oriented. The two main sides 203, 204 will individually be referred to as inner main side 203 and outer main side 204 for the sake of convenience.

The stator 202 comprises a pair of windings 205, 206, which are axially aligned with the rotor 101 as illustrated in FIG. 1. The windings 205, 206 will individually be referred to as upper winding 205 and lower winding 206 for the sake of convenience. The upper winding 205 radially faces an upper portion of the outer main side of the rotor 204. The lower winding 206 radially faces a lower portion of the outer main side 204. The upper winding 205 has a pair of terminals 207, 208 through which the upper winding 205 can receive an electrical signal and provide an electrical signal. The lower winding 206 also has such a pair of terminals 209, 210.

The electric motor 100 having the axial flux configuration, which is illustrated in FIG. 1, and the electric motor 200 having the radial flux, which is illustrated in FIG. 2, have the following in common. A magnetic field emanates from the rotor 101, 201 which induces a magnetic flux in the upper winding 105, 205 and a magnetic flux in the lower winding 106, 206. An upward axial displacement of the rotor 101, 201 causes an increase in magnitude of the magnetic flux in the upper winding 105, 205 and a decrease in magnitude of the magnetic flux in the lower winding 106, 206 of the stator 102, 202. Conversely, a downward axial displacement of the rotor 101, 201 causes a decrease in magnitude of the magnetic flux in the upper winding 105, 205 and an increase in magnitude of the magnetic flux in the lower winding 106, 206 of the stator 102, 202

It should be noted that, for the sake of explanation, FIGS. 1 and 2 are highly simplified representations of electric motors having the axial flux configuration and the radial flux configuration, respectively. An element of simplification consists in illustrating these electric motors as being single phase. In practice, the electric motors may be multiphase comprising multiple pairs of windings, whereby a pair of winding corresponds with a phase. For example, a three phase version of the electric motors illustrated in FIGS. 1 and 2 may comprise three pairs of windings, which may be angularly shifted with respect to each other.

Another element of simplification consists in the windings 105, 106, 205, 206 being represented as having each a single turn. In practice, a winding may comprise multiple turns. Moreover, there are various winding schemes according to which the windings may be implemented, including lap winding and wave winding. Also, the winding may comprise ferromagnetic circuits, such as, for example, yokes, slots, which are not represented in FIGS. 1 and 2 for the sake of simplicity.

Yet another element of simplification, or rather, illustration, consists in the rotor 101, 201 comprising three magnetic pole pairs. The rotor 101, 201 may comprise a greater number of pole pairs. Moreover, the rotor 101, 201 may have a structure different from those illustrated in FIGS. 1 and 2. For example, permanent magnets that provide magnetic pole pairs may be arranged differently from what is shown in these figures. Conversely, the rotor 101, 201 may have only two pole pairs, or even a single pole pair.

Figure 3:
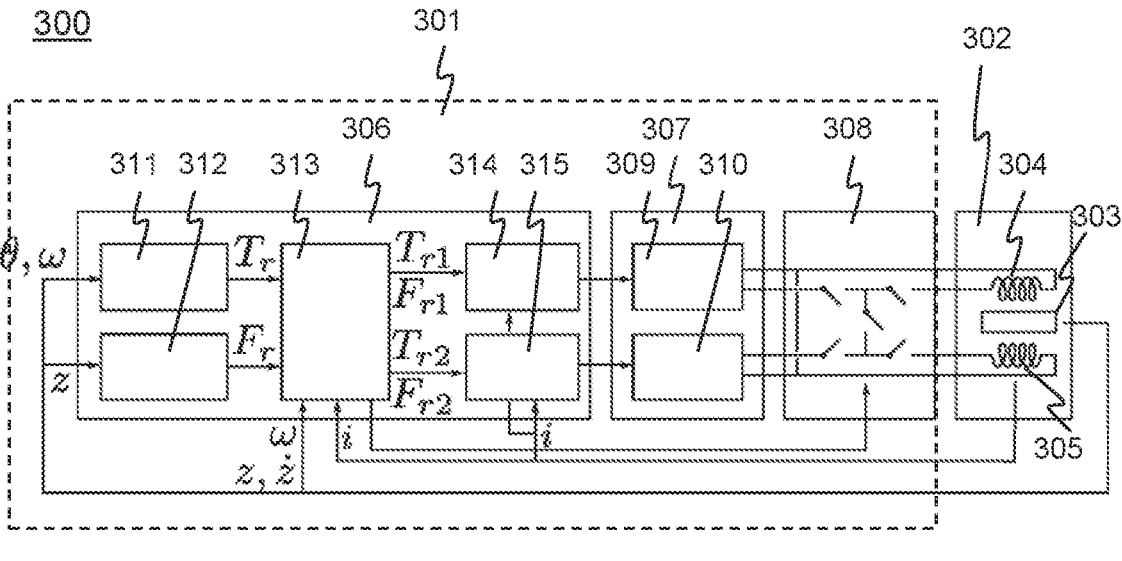
FIG. 3 is a schematic block diagram of a dual inverter electric machine in an inactive state.

FIG. 3 schematically illustrates a dual inverter electric machine 300 in an inactive state. FIG. 3 provides a schematic block diagram of this electric machine 300 in the inactive state. The dual inverter electric machine 300 basically comprises a driver 301 and an electric motor 302, which may be the electric motor 100 having the axial flux configuration illustrated in FIG. 1 or the electric motor 200 having the radial flux illustrated in FIG. 2. Accordingly, the electric motor 302 of the dual inverter electric machine 300 comprises a rotor 303, which may correspond with the rotor 101 illustrated in FIG. 1, or the rotor 201 illustrated in FIG. 2. Further, the electric motor 302 of the dual inverter electric machine 300 comprises a stator having a pair of windings 304, 305, which may correspond with the pair of windings 105, 106 illustrated in FIG. 1 or the pair of windings 205, 206 illustrated in FIG. 2. Likewise, the pair of windings 304, 305 of the motor of the dual inverter electric machine 300 will individually be referred to as upper winding 304 and lower winding 305 for the sake of convenience. However, it should be understood that these designations are interchangeable given that the aforementioned windings 304, 305 are functionally equivalent.

The driver 301 comprises a controller 306, a power electronics part 307, and a switch circuit 308. In this embodiment, the power electronics part 307 comprises two N-phase inverters 309, 310. The switch circuit 308 comprises five switches as illustrated in FIG. 3. Since FIG. 3 schematically illustrates the inactive state, these switches are each in an open state. The controller 306 may comprise various modules: a spin position and speed control module 311, an axial position control module 312, an operating mode decision module 313, and two force and torque control modules 314, 315, one for each of the two N-phase inverters 309, 310. The controller 306 may be implemented by means of a processor, or a set of processors, that is suitably programmed. A module of the controller 306 may then correspond with a software program, or a part of the software program, that is stored in a program memory of the controller 306.

The dual inverter electric machine 300 may further comprise one or more sensors, which are not represented in FIG. 3 for the sake of simplicity. A sensor may provide an indication on an angular position of the rotor, or a rotational speed of the rotor, or an axial position of the rotor, or a characteristic of a signal in the pair of windings 304, 305 of the stator, or any combination of these indications. In this embodiment, the controller 306 receives the aforementioned indications and uses these for controlling the two N-phase inverters 309, 310 and the switch circuit 308.

Figure 4:
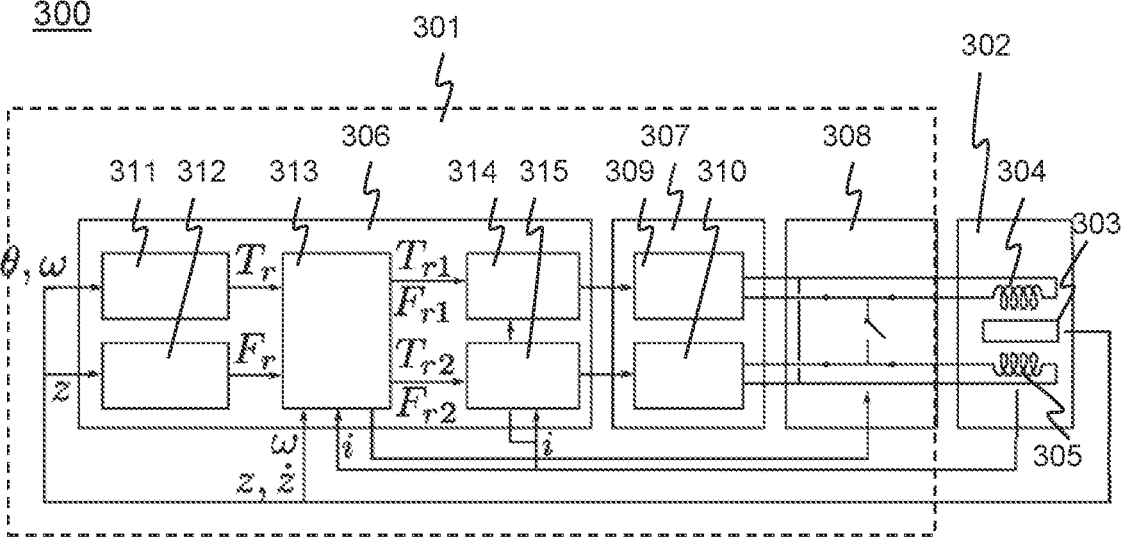
FIG. 4 is a schematic block diagram of the dual inverter electric machine operating in a dual drive with active electromagnetic bearing mode.

FIG. 4 schematically illustrates the dual inverter electric machine 300 operating in a dual drive with active electromagnetic bearing mode. FIG. 4 provides a schematic block diagram almost identical to that of FIG. 3, except for the respective states of the five switches in the switch circuit 308. The controller 306 has set these switches in the respective states as shown in FIG. 4 to make the dual inverter electric machine 300 operate in the dual drive with active electromagnetic bearing mode, In this mode, one of the two N-phase inverters 309, 310 is coupled to the upper winding 304; the other N-phase inverter is coupled to the lower winding 305. In FIG. 4, the N-phase inverter 309 is coupled to the upper winding 304, whereas the other N-phase inverter 310 is coupled to the lower winding 305. Evidently, the inverse can also apply: the N-phase inverter 310 is coupled to the upper winding 304, whereas the other N-phase inverter is coupled to the lower winding 305.

In the dual drive with active electromagnetic bearing mode, the electric motor 302 thus receives two drive signals from the two N-phase inverters 309, 310. Each drive signal may have a drive component and a suspension component. The drive component causes the magnetic field produced by the pair of windings 304, 305 to have a drive component that exerts a torque on the rotor 303 through interaction with the magnetic field emanating from the rotor 303. The suspension component causes the magnetic field produced by the pair of windings 304, 305 to have a suspension component that exerts a suspension force on the rotor 303 through interaction with the magnetic field emanating from the rotor 303.

The controller 306 may control the drive component so that the rotor 303 spins at a desired speed and produces a desired torque. This drive control may involve the spin position and speed control module 311. The drive control may be based on indications on the angular position of the rotor 303 and on the spin speed of the rotor 303. The spin position and speed control module 311 may receive these indications as illustrated in FIG. 4.

The controller 306 may control the suspension component so that the rotor 303 maintains a desired axial position, which corresponds to the rotor 303 being suspended. This suspension control, which provides an active electromagnetic bearing, may involve the axial position control module 312. The suspension control may be based on indications on the axial position of the rotor 303. The axial position control module 312 may receive this indication as illustrated in FIG. 4.

Figure 5:
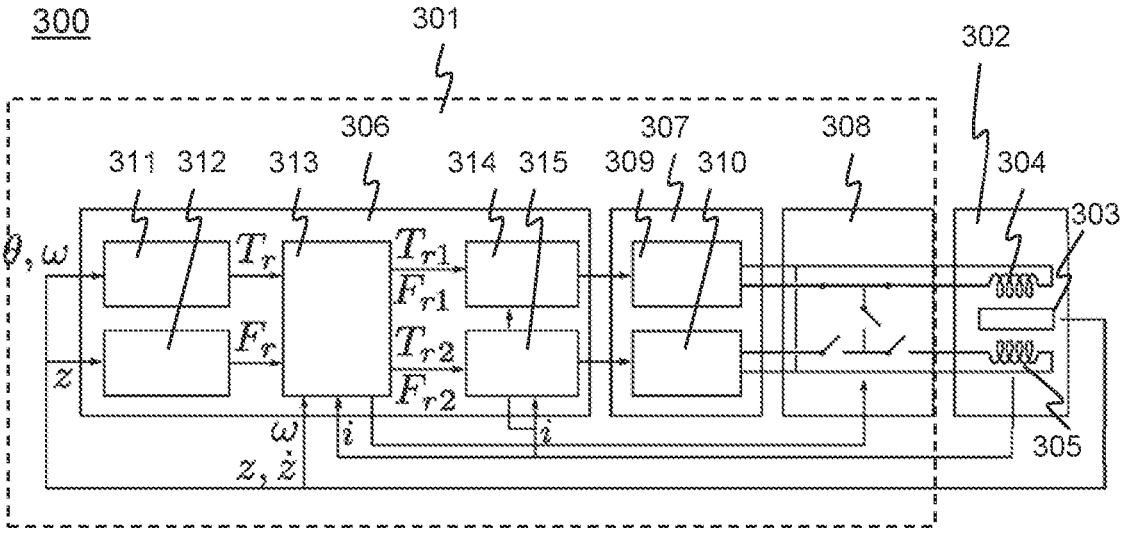
FIG. 5 is a schematic block diagram of the dual inverter electric machine operating in a single drive with active electromagnetic bearing mode.

FIG. 5 schematically illustrates the dual inverter electric machine 300 operating in a single drive with active electromagnetic bearing mode. FIG. 5 provides a schematic block diagram almost identical to that of FIGS. 3 and 4, except for the respective states of the five switches in the switch circuit 308. The controller 306 has set these switches in the respective states as shown in FIG. 5 to make the dual inverter electric machine 300 operate in the single drive with active electromagnetic bearing mode. In this mode, only one of the two N-phase inverters 309, 310 is coupled to a single winding of the pair of windings 304, 305 FIG. 5 illustrates an example in which the upper winding 304 is coupled to N-phase inverter 309. The lower winding 305 is decoupled from each of the two N-phase inverters 309, 310 and is thus also decoupled from the upper winding 304. However, the lower winding 305 may be used as a sensor for measuring an axial displacement of the rotor 303.

Evidently, connection schemes other than the one illustrated in FIG. 5 can also apply in the single drive with active electromagnetic bearing mode. For example, the upper winding 304 may be coupled to N-phase inverter 310. As another example, the lower winding 305 may be coupled to N-phase inverter 309, whereas the upper winding 304 is decoupled from each of the two N-phase inverters 309, 310. The upper winding 304 may then be used as a sensor. As yet another example, the lower winding 305 may be coupled to N-phase inverter 310, In the single drive with active electromagnetic bearing mode, the electric motor 302 thus receives a single drive signal from a single N-phase inverter at a single winding. The single drive signal may have a drive component and a suspension component as described hereinbefore. The controller 306 may control the drive component and the suspension component as described hereinbefore. Accordingly, in this mode too, the rotor 303 may spin at a desired speed and produce a desired torque. However, there will be a lower maximum for the desired torque, typically reduced by half, due to the fact that only a single winding receives a single drive signal from a single N-phase inverter. Further, the same may apply to the suspension force mentioned hereinbefore with respect to the dual drive with active electromagnetic bearing mode illustrated in FIG. 4.

The controller 306 may cause the dual inverter electric machine 300 to switch from the dual drive with active electromagnetic bearing mode, which is illustrated in FIG. 4, to the single drive with active electromagnetic bearing mode, which is illustrated in FIG. 5. The controller 306 may do so, in case, for example, one of the two N-phase inverters 309, 310 malfunctions, or in case a winding of the pair of windings 304, 305 malfunctions, which is a partial malfunction of the stator. The controller 306 may detect such a malfunction on the basis of, for example, an indication of a characteristic of a signal in a winding of the pair of windings 304, 305. The signal may have a magnitude that is too low or may exhibit another anomaly. By switching to the single drive with active electromagnetic bearing mode, a malfunctioning of the dual inverter electric machine 300 as a whole may be prevented. Typically, such a malfunctioning consists in a malfunctioning of the active electromagnetic bearing, which may cause a crash of the rotor 303. Moreover, as a result, the electric motor 302 will fail.

Figure 6:
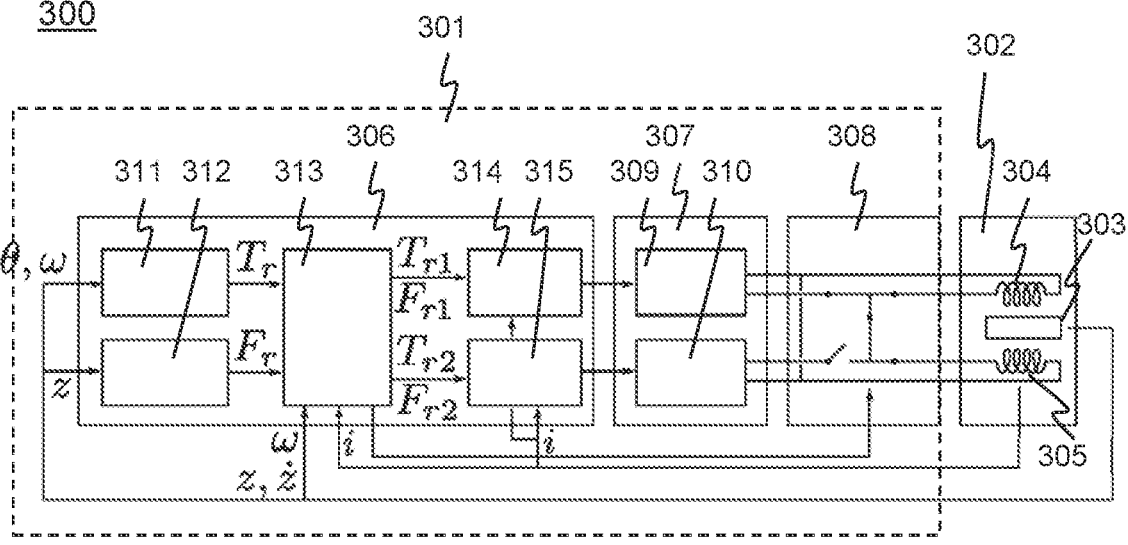
FIG. 6 is a schematic block diagram of the dual inverter electric machine operating in a single drive with passive electromagnetic bearing mode.

FIG. 6 schematically illustrates the dual inverter electric machine 300 operating in a single drive with passive electromagnetic bearing mode. FIG. 6 provides a schematic block diagram almost identical to that of FIGS. 3, 4, and 5, except for the respective states of the five switches in the switch circuit 308. The controller 306 has set these switches in the respective states as shown in FIG. 6 to make the dual inverter electric machine 300 operate in the single drive with passive electromagnetic bearing mode. In this mode, the upper winding 304 and the lower winding 305 are interconnected with each other and jointly coupled to one of the two N-phase inverters 309, 310. In FIG. 6, the upper winding 304 and the lower winding 305 are jointly coupled to N-phase inverter 309. Evidently, another connection scheme can also apply: the upper winding 304 and the lower winding 305 are jointly coupled to N-phase inverter 310.

In the single drive with passive electromagnetic bearing mode, the rotor 303 may maintain an equilibrium axial position, which corresponds to the rotor 303 being suspended, without requiring any control as described hereinbefore. This is due to the following electromagnetic phenomena. As explained hereinbefore, an axial displacement of the rotor 303 causes a magnetic flux change in the upper winding 304 and a magnetic flux change in the lower winding 305. One of the two aforementioned magnetic flux changes is an increase in magnitude, whereas the other is a decrease in magnitude. The upper winding 304 and the lower winding 305 are interconnected with each other so that the magnetic flux change in the upper winding 304 and that in the lower winding 305 generates a suspension current in these windings 304, 305. This suspension current is generated when the rotor 303 rotates. The suspension current causes the magnetic field produced by the stator to have a component that exerts a restoring force on the rotor 303 counteracting the axial displacement. The electromagnetic phenomena described hereinbefore thus provides a passive electromagnetic bearing.

The manner in which the upper winding 304 and the lower winding 305 are interconnected with each other depends on how these windings 304, 305 are arranged and how the rotor 303 is arranged. This determines whether the magnetic flux in the upper winding 304 and that in the lower winding 305 have similar orientations or opposite orientations. Referring to the electric motor 100 illustrated in FIG. 1, the orientations are opposite. In that case, the left terminal 107 of the upper winding 105 is connected to the left terminal 109 of the lower winding 106. The right terminal 108 of the upper winding 105 is connected to the right terminal 110 of the lower winding 106. Referring to the electric motor 200 illustrated in FIG. 2, the orientations are similar. In that case, the left terminal 207 of the upper winding 205 is connected to the right terminal 210 of the lower winding 206; the right terminal 208 of the upper winding 205 is connected to the left terminal 209 of the lower winding 206.

In order for the electromagnetic phenomena described hereinbefore to provide the passive electromagnetic bearing, the rotor 303 should spin sufficiently fast, at a speed that is above a threshold spin speed. This threshold speed depends on various factors including electromagnetic and mechanical characteristics of the rotor 303 and the stator. The equilibrium axial position that is achieved also depends various factors including electromagnetic characteristics of the upper winding 304 and the lower winding 305, as well as on electromagnetic and dynamic characteristics of the rotor 303. Moreover, the equilibrium axial position may also depend on external factors, such as, for example, a force exerted on the rotor, or a gravitational force, or a combination of these.

The controller 306 may cause the dual inverter electric machine 300 to switch from the single drive with active electromagnetic bearing mode, which is illustrated in FIG. 5, to the single drive with passive electromagnetic bearing mode, which is illustrated in FIG. 6. The controller 306 may do so, in case, for example, the rotor 303 spins sufficiently fast, at a speed that is above the threshold spin speed. By switching to the single drive with passive electromagnetic bearing mode, no active suspension control is needed, which may allow higher spin speeds. The controller 306 may also cause the dual inverter electric machine 300 to switch from the dual drive with active electromagnetic bearing mode, which is illustrated in FIG. 4, to the single drive with passive electromagnetic bearing mode, which is illustrated in FIG. 6. However, in the latter mode, a maximum torque that the electric motor 302 can produce may be lower due to the fact that only a single N-phase inverter drives the electric motor 302.

Figure 7:
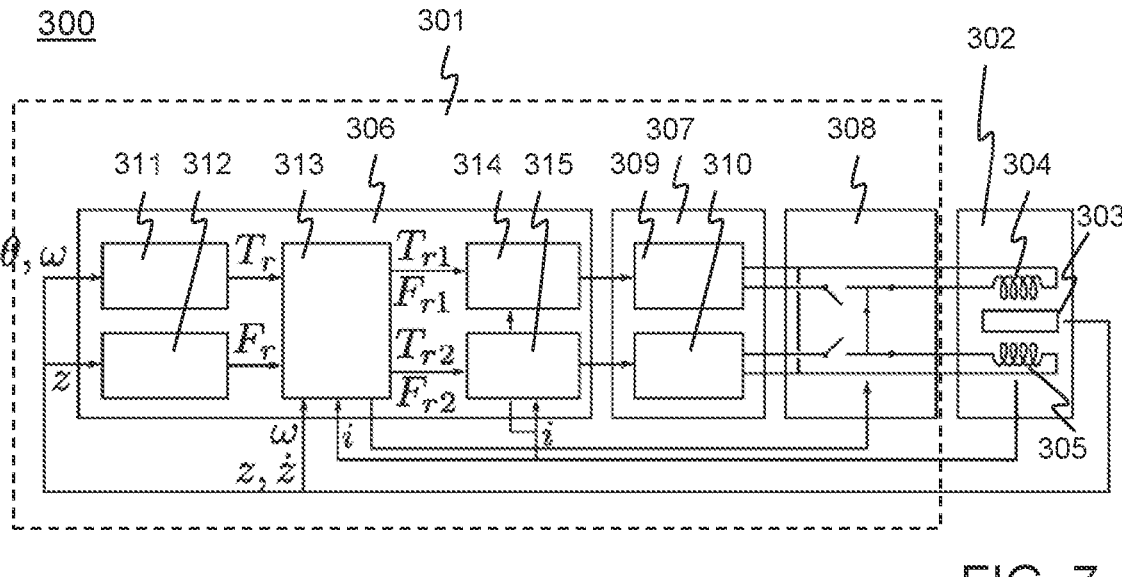
FIG. 7 is a schematic block diagram of the dual inverter electric machine operating in a passive electromagnetic bearing mode without drive.

FIG. 7 schematically illustrates the dual inverter electric machine 300 operating in a passive electromagnetic bearing mode without drive. FIG. 7 provides a schematic block diagram almost identical to that of FIGS. 3, 4, 5 and 6, except for the respective states of the five switches in the switch circuit 308. The controller 306 has set these switches in the respective states as shown in FIG. 7 to make the dual inverter electric machine 300 operate in the passive electromagnetic bearing mode without drive. In this mode, the upper winding 304 and the lower winding 305 are interconnected with each other, but both decoupled from the two N-phase inverters 309, 310. The stator thus receives no drive signal. The rotor 303 may maintain an equilibrium axial position, which corresponds to the rotor 303 being suspended, as long as the rotor 303 spins sufficiently fast. This is thanks to the passive electromagnetic bearing described hereinbefore, which provides sufficient restoring force above the threshold spin speed.

The controller 306 may cause the dual inverter electric machine 300 to switch from the single drive with active electromagnetic bearing mode, which is illustrated in FIG. 5, to the passive electromagnetic bearing mode without drive, which is illustrated in FIG. 7. The controller 306 may do so, in case, for example, the N-phase inverter that is operational in the single drive with active electromagnetic bearing mode malfunctions making that both N-phase inverters malfunction. By switching to passive electromagnetic bearing mode without drive, the rotor 303 may maintain an equilibrium axial position, which corresponds to the rotor 303 being suspended, as long as the rotor 303 spins sufficiently fast. The passive electromagnetic bearing may prevent a damaging incident such as, for example, the rotor 303 crashing, as it were, against the stator or another component while the rotor 303 still spins relatively fast.

The passive electromagnetic bearing mode without drive allows a safe and soft landing of the rotor 303. Having switched to this mode, the rotor 303 slows down, gradually spinning at a lower speed. The aforementioned restoring force will gradually become weaker making that the rotor 303 will gradually move towards a structural component on which the rotor 303 will eventually land. The rotor 303 having sufficiently slowed down and sufficiently approximated its landing place, the landing may be safe and soft. In contrast, in the active electromagnetic bearing mode, the suspension force may abruptly disappear making that the rotor 303 may have a crash landing.

The controller 306 may also cause the dual inverter electric machine 300 to switch from the single drive with passive electromagnetic bearing mode, which is illustrated in FIG. 6, to the passive electromagnetic bearing mode without drive, which is illustrated in FIG. 7. The controller 306 may do so for the reason as described in the foregoing.

Figure 8:
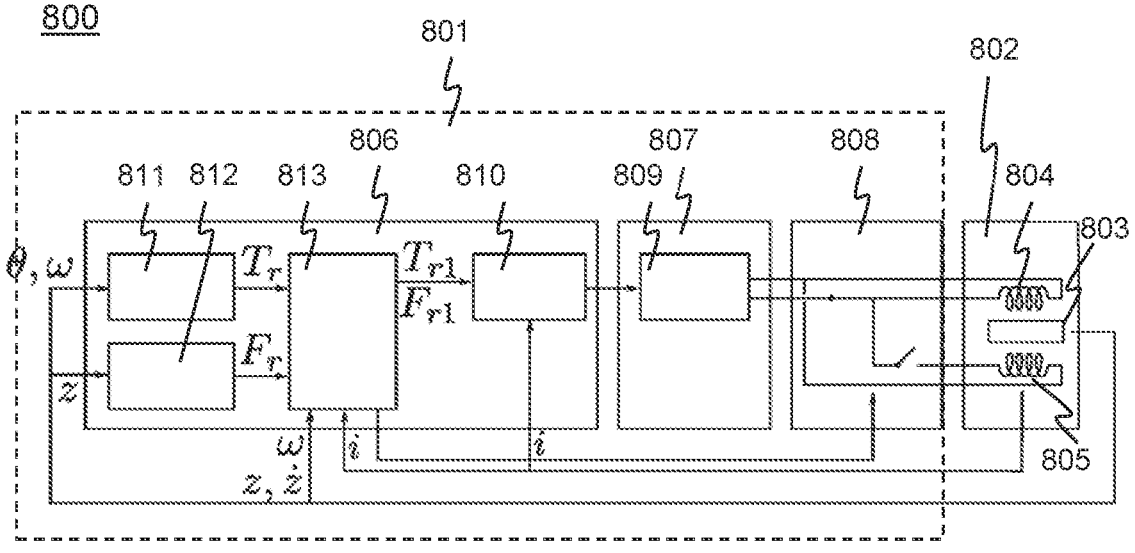
FIG. 8 is a schematic block diagram of a single inverter electric machine operating in a drive with active electromagnetic bearing mode.

FIG. 8 schematically illustrates a single inverter electric machine 800 operating in a drive with active electromagnetic bearing mode. FIG. 8 provides a schematic block diagram of single inverter electric machine 800 operating in this mode. Like the dual inverter electric machine 300, the single inverter electric machine 800 also basically comprises a driver 801 and an electric motor 802. The electric motor 802 comprises a rotor 803 and a stator that has a pair of windings 804, 805, The remarks made hereinbefore with respect to the electric motor 302 in the dual inverter electric machine 300 equally apply to the electric motor 802 in the single inverter electric machine 800.

The driver 801 in the single inverter electric machine 800 is a simplified version of the driver 301 in the dual inverter electric machine 300. The driver 801 comprises similar functional parts: a controller 806, a power electronics part 807, and a switch circuit 808. However, in this embodiment, the power electronics part 807 comprises a single N-phase inverter 809. The switch circuit 808 comprises two switches as illustrated in FIG. 8. The controller 806 comprises a single force and torque control module 810. For the rest, the controller 806 comprises a spin position and speed control module 811, an axial position control module 812, and an operating mode decision module 813, similar to the controller 306 in the dual inverter electric machine 300.

In this embodiment too, the controller 806 may be implemented by means of a processor, or a set of processors, that is suitably programmed. A module of the controller 806 may then correspond with a software program, or a part of the software program, that is stored in a program memory of the controller 806. For the rest, the single inverter electric machine 800 may further comprise one or more sensors, as discussed hereinbefore with respect to the dual inverter electric machine 300. These sensors are not represented in FIG. 8 for the sake of simplicity.

As mentioned hereinbefore, FIG. 8 schematically illustrates the single inverter electric machine 800 operating in the drive with active electromagnetic bearing mode. The controller 806 has set the two respective switches in the respective states as shown in FIG. 8 to make the electric machine operate in the drive with active electromagnetic bearing mode. In this mode, a single N-phase inverter is coupled to a single winding. FIG. 8 illustrates an example in which N-phase inverter 809 is coupled to the upper winding 804. The lower winding 805 is decoupled from the N-phase inverter 809 and is thus also decoupled from the upper winding 804. The lower winding 805 may be used as a sensor for measuring an axial displacement of the rotor 803. Evidently, an inverse connection scheme could also apply in the drive with active electromagnetic bearing mode. The lower winding 805 may be coupled to N-phase inverter 809, whereas the upper winding 804 is decoupled from N-phase inverters 809.

The drive with active electromagnetic bearing mode is similar to the single drive with active electromagnetic bearing mode described hereinbefore with reference to FIG. 5, which concerns the dual inverter electric machine 300. The electric motor 802 receives a drive signal from the single N-phase inverter 809 at its upper winding 804. The single drive signal may have a drive component and a suspension component as described hereinbefore. The controller 806 may control the drive component and the suspension component as described hereinbefore. Accordingly, the rotor 803 may spin at a desired speed and produce a desired torque. The rotor 803 maintains a desired axial position, which corresponds to the rotor 803 being suspended, through active control of the suspension component. This active control may be based on indications on the axial position of the rotor 803. As mentioned hereinbefore, the lower winding 805 may provide such an indication.

Figure 9:
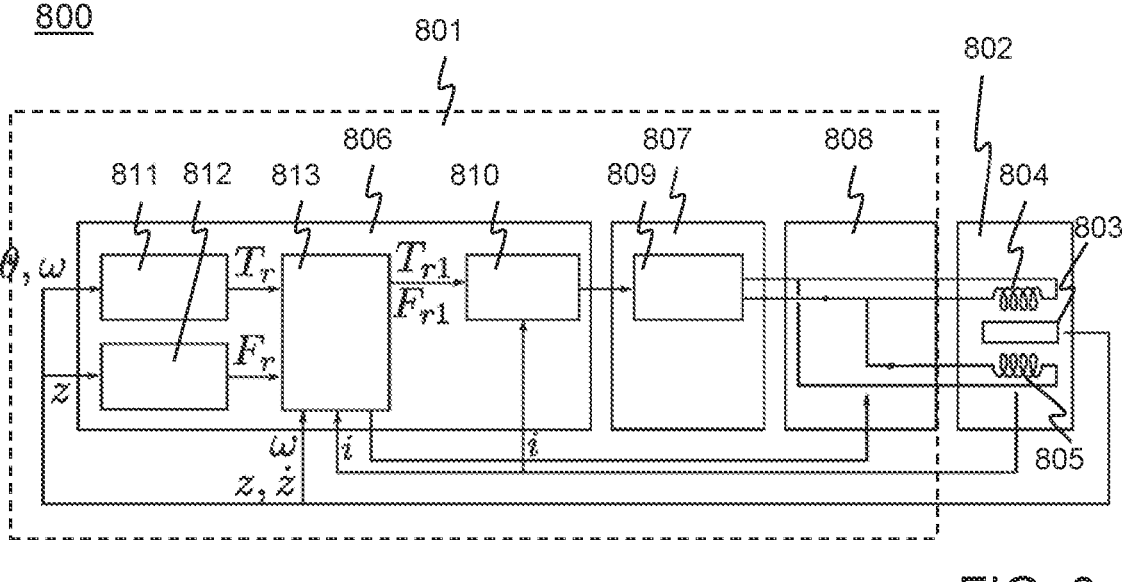
FIG. 9 is a schematic block diagram of a single inverter electric machine operating in a drive with passive electromagnetic bearing mode.

FIG. 9 schematically illustrates the single inverter electric machine 800 operating in a drive with passive electromagnetic bearing mode. FIG. 9 provides a schematic block diagram almost identical to that of FIG. 8, except for the respective states of the two switches in the switch circuit 808. The controller 806 has set these switches in the respective states as shown in FIG. 9 to make the electric machine operate in the drive with passive electromagnetic bearing mode. In this mode, the upper winding 804 and the lower winding 805 are interconnected with each other and jointly coupled to the single N-phase inverter 809.

The drive with passive electromagnetic bearing mode is similar to the single drive with passive electromagnetic bearing mode described hereinbefore with reference to FIG. 6, which concerns the dual inverter electric machine 300. The rotor 803 may maintain an equilibrium axial position, which corresponds to the rotor 803 being suspended, without requiring any active control. This is due the electromagnetic phenomena described hereinbefore with respect to the single drive with passive electromagnetic bearing mode illustrated in FIG. 6.

The controller 806 may cause the electric machine to switch from the drive with active electromagnetic bearing mode, which is illustrated in FIG. 8, to the drive with passive electromagnetic bearing mode, which is illustrated in FIG. 9. The controller 806 may do so, in case, for example, the rotor 803 spins sufficiently fast, at a speed that is above the threshold spin speed. By switching to the single drive with passive electromagnetic bearing mode, no active suspension control is needed, which may allow higher spin speeds.

Figure 10:
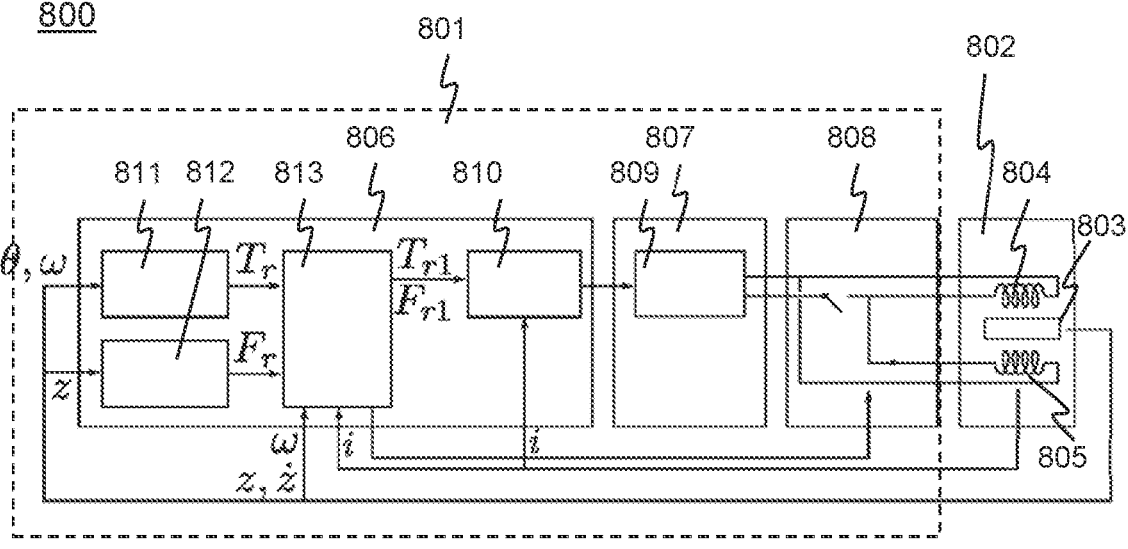
FIG. 10 is a schematic block diagram of a single inverter electric machine operating in a passive electromagnetic bearing mode without drive.

FIG. 10 schematically illustrates the single inverter electric machine 800 operating in a passive electromagnetic bearing mode without drive. FIG. 10 provides a schematic block diagram almost identical to that of FIGS. 8 and 9, except for the respective states of the two switches in the switch circuit 808. The controller 806 has set these switches in the respective states as shown in FIG. 10 to make the electric machine operate in the passive electromagnetic bearing mode without drive. In this mode, the upper winding 804 and the lower winding 805 are interconnected with each other, and both decoupled from the single N-phase inverter 809. The stator thus receives no drive signal. The rotor 803 may maintain an equilibrium axial position, which corresponds to the rotor 803 being suspended, as long as the rotor 803 spins sufficiently fast. This is thanks to the passive electromagnetic bearing described hereinbefore, which provides sufficient restoring force above the threshold spin speed.

The controller 806 may cause the electric machine to switch from the drive with active electromagnetic bearing mode, which is illustrated in FIG. 8, to the passive electromagnetic bearing mode without drive, which is illustrated in FIG. 10. The controller 806 may do so, in case, for example, the single N-phase inverter 809 malfunctions. By switching to the passive electromagnetic bearing mode without drive, the rotor 803 may maintain an equilibrium axial position, which corresponds to the rotor 803 being suspended, as long as the rotor 803 spins sufficiently fast. As explained hereinbefore, the passive electromagnetic bearing may prevent a damaging incident such as, for example, the rotor 803 crashing, as it were, against the stator or another component while the rotor 803 still spins relatively fast. The controller 806 may also cause the electric machine to switch from the drive with passive electromagnetic bearing mode, which is illustrated in FIG. 9, to the passive electromagnetic bearing mode without drive, which is illustrated in FIG. 10. The controller 806 may do so for the reason as described in the foregoing.

Figure 11:
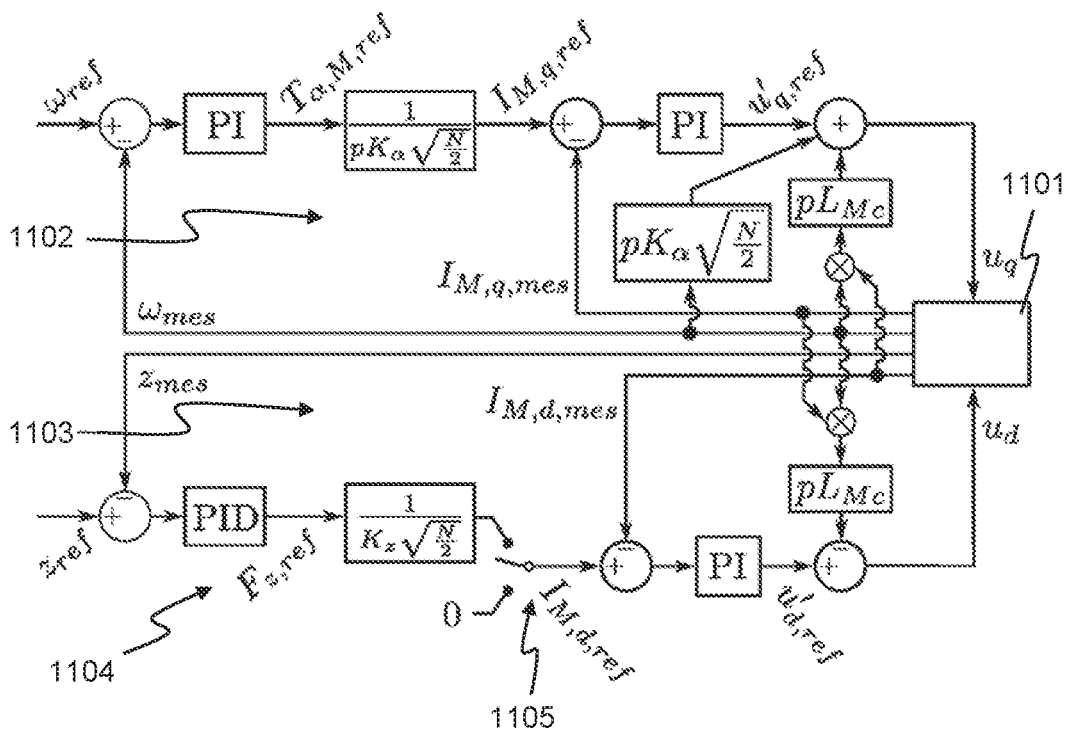
FIG. 11 is a schematic block diagram of a control scheme for controlling an electric motor in an active electromagnetic bearing mode and in a passive electromagnetic bearing mode.

FIG. 11 schematically illustrates a control scheme 1100 for controlling an electric motor assembly 1101. FIG. 11 provides a schematic block diagram of the control scheme 1100 in which a block schematically represents the electric motor assembly 1101. The controller 806 in the single inverter electric machine 800, which is illustrated in FIGS. 8-10, may operate in accordance with the control scheme 1100 illustrated in FIG. 11. Accordingly, the electric motor assembly 1101, which comprises a rotor and a stator, may include the electric motor 802 in the single inverter electric machine 800. The electric motor assembly 1101 may further include signal conversion and amplifier circuits.

The schematic block diagram comprises an upper part that represents a drive control portion 1102 of the control scheme 1100. A lower part represents a suspension control portion 1103 of the control scheme 1100. The drive control portion 1102 controls a signal component $u_q$ that is applied to the electric motor assembly 1101. The suspension control portion 1103 controls a further signal component $u_d$ that is applied to the electric motor assembly 1101. The aforementioned signal components $u_q$, $u_d$ determine the aforementioned drive component and the aforementioned suspension component that provide the torque and the suspension force, respectively. The notations $\omega_{ref}$ and $\omega_{mes}$ represent a set point spin speed and a measured spin speed, respectively. The notations $z_{ref}$ and $z_{mes}$ represent a set point axial position and a measured axial position, respectively.

The notations $I_{M,d,ref}$ and $I_{M,d,mes}$ represent a set point direct-axis component of the drive current and a measured direct-axis component of the drive current, respectively. The notations $I_{M,q,ref}$ and $I_{M,q,mes}$ represent a set point quadrature-axis component of the drive current and a measured quadrature-axis component of the drive current, respectively. The notations N and p represent the number of phases and the number of rotor pole pairs, respectively. The notations $K_a$ and $K_z$ represent the amplitude of the magnetic flux intercepted by the winding in a centered position and the proportionality factor between the amplitude of this magnetic flux and the axial position, respectively. The notation $I_{Mc}$ represents the synchronous inductance of the winding as seen from the inverters.

The suspension control portion 1103 comprises a rotor positioning control section 1104, which is illustrated in broken lines. This control section 1104 is active only in the active electromagnetic bearing mode. This is schematically illustrated by means of a switch 1105, which includes a rotor positioning control section 1104 in the control scheme 1100 when the switch 1105 has an upper position, whereas a zero value (0) is applied when the switch 1105 has a lower position. The upper position thus corresponds with the active electromagnetic bearing mode; the lower position corresponds with the passive electromagnetic bearing mode.

In the control scheme 1100, an axial force exerted on the rotor is accounted for when switching from the passive electromagnetic bearing mode to the active electromagnetic bearing mode. This axial force may be estimated on the basis of the measured spin speed $\omega_{mes}$ of the rotor and the measured axial position $z_{mes}$ of the rotor. The axial force exerted on the rotor may be feed-forwarded in an integral term of a position regulator, which is not explicitly represented in FIG. 11. In this way, an axial disturbance affecting the electric motor assembly 1101 is limited to a setpoint step towards a centered axial position (z=0). This mitigates transient effects that may occur when switching from the passive electromagnetic bearing mode to the active electromagnetic bearing mode. Such transient effects may further be mitigated by adjusting controller gains in the control scheme 1100.

Transients effect may further be mitigated by setting the set point axial position $z_{mes}$ to an axial position at which the rotor stabilizes in passive mode. For a switch from the active electromagnetic bearing mode to the passive electromagnetic bearing mode, this axial position can be evaluated by substituting an estimation of an axial load into an expression of the restoring force in quasistatic conditions. The estimation of the axial load may be obtained on the basis of a measured direct-axis motor current $I_{M,d,mes}$, a current stiffness, and the measured spin speed $\omega_{mes}$. For a switch from the passive electromagnetic bearing mode to the active electromagnetic bearing mode, the set point axial position $z_{ref}$ may be calculated as a moving average of measured axial positions in the electromagnetic bearing mode passive mode.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to electric machines provided with an electromagnetic bearing. In the presented embodiments, electric machines comprise an electric motor. In other embodiments, electric machines may comprise an electric generator.

There are numerous different ways of implementing an electric machine in accordance with the invention. The embodiments presented hereinbefore, comprise switch circuits 308, 808 as illustrated in FIGS. 3-7 and in FIGS. 8-10, respectively. Other embodiments, may comprise different switch circuits. For example, referring to the switch circuit 808 illustrated in FIGS. 8-10, a switch may be added that allows selecting the upper winding 804 or the lower winding 805 in the drive with active electromagnetic bearing mode that is illustrated in FIG. 8. Also, an electric machine in accordance with the invention need not comprise a distinct switch circuit as the switch circuits 308, 808 illustrated in FIGS. 3-7 and in FIGS. 8-10, respectively. An alternative to the power electronics parts 307, 807 illustrated in the aforementioned figures may comprise one or more N-phase inverters that incorporate switch functions allowing to switch between an active electromagnetic bearing mode and a passive electromagnetic bearing mode.

There are numerous different ways of implementing a stator in an electric machine in accordance with the invention. In the embodiments presented hereinbefore, the windings 105, 106, 205, 206 of a phase are represented as being formed by a single coil structure. In other embodiments, the windings of a phase may be formed by a plurality of coil structures.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. An electric machine provided with an electromagnetic bearing, the electric machine comprising:

a rotor from which a magnetic field emanates;

a stator adapted to produce a magnetic field that interacts with the magnetic field emanating from the rotor, the stator comprising a pair of windings symmetrically positioned with respect to the rotor so that a displacement of the rotor causes an increase in magnitude of a magnetic flux induced by the rotor in one winding of the pair of windings and a decrease in magnitude of a magnetic flux induced by the rotor in the other winding of the pair of windings; and a driver adapted to operate in an active electromagnetic bearing mode in which the driver applies a suspension signal component to at least one winding of the pair of windings, which causes the magnetic field produced by the stator to have a component that exerts a suspension force on the rotor through interaction with the magnetic field emanating from the rotor, wherein the driver comprises a controller configured to make the driver operate in a passive electromagnetic bearing mode instead of in the active electromagnetic bearing mode depending on at least one operational condition of the electric machine, whereby, in the passive electromagnetic bearing mode, the driver interconnects the pair of windings of the stator with each other so that the increase in magnitude of the magnetic flux in the one winding and the decrease in magnitude the other winding of the pair of windings generates a suspension current in the pair of windings that causes the magnetic field produced by the stator to have a component that exerts a restoring force on the rotor counteracting the displacement.

2. The electric machine according to claim 1, wherein the pair of windings is disposed so that, in the passive electromagnetic bearing mode, the restoring force counteracts an axial displacement of the rotor.

3. The electric machine according to claim 1, wherein the driver is adapted to apply a drive signal component to at least one winding of the pair of windings, which causes the magnetic field produced by the stator to have a component that exerts a torque on the rotor through interaction with the magnetic field emanating from the rotor.

4. The electric machine according to claim 3, wherein the driver is adapted to jointly apply the suspension signal component and the drive signal component to a single winding of the pair of windings of the stator in the active electromagnetic bearing mode.

5. The electric machine according to claim 4, wherein, in the active electromagnetic bearing mode, the electric machine is adapted to use the other winding of the pair of windings of the stator as part of a sensor for measuring the displacement of the rotor.

6. The electric machine according to claim 1, wherein the controller is adapted to make the driver operate in the active electromagnetic bearing mode when the rotor has a rotational speed that is below a threshold speed and in the passive electromagnetic bearing mode when the rotor has a rotational speed that is above the threshold speed.

7. The electric machine according to claim 1, wherein the electric machine comprises at least one sensor adapted to provide the controller at least one of the following indications: an angular position of the rotor, a rotational speed of the rotor, an axial position of the rotor, and a characteristic of a signal in the pair of windings of the stator.

8. The electric machine according to claim 7, wherein the controller is adapted to account for an axial force exerted on the rotor when switching from the passive electromagnetic bearing mode to the active electromagnetic bearing mode.

9. The electric machine according to claim 7, wherein the controller is adapted to estimate an axial position at which the rotor stabilizes in the passive electromagnetic bearing mode and to apply this axial position as a set point in the active electromagnetic bearing mode.

10. The electric machine according to claim 1, wherein the controller is adapted to force the driver to operate in the passive electromagnetic bearing mode upon detection of a malfunction of the driver in the active electromagnetic bearing mode.

11. The electric machine according to claim 1, wherein the driver comprises two N-phase inventers, whereby:

in the active electromagnetic bearing mode, one of the two N-phase inventers is coupled to one winding of the pair of windings, the other N-phase inverter being coupled to the other winding of the pair of windings; and in the passive electromagnetic bearing mode, the pair of windings of the stator are interconnected and at least one of the two N-phase inventers is coupled to the pair of windings that are interconnected.

12. The electric machine according to claim 11, wherein the electric machine is adapted to detect a malfunction of an N-phase inverter among the two N-phase inverters and to make that the N-phase inverter is decoupled from the winding of the stator to which the N-phase inverter is otherwise coupled in the active electromagnetic bearing mode.

13. An electromechanical system comprising an electric machine according to claim 1.

14. A method of operating an electric machine provided with an electromagnetic bearing, the electric machine comprising:

a rotor from which a magnetic field emanates;

a stator adapted to produce a magnetic field that interacts with the magnetic field emanating from the rotor, the stator comprising a pair of windings symmetrically positioned with respect to the rotor so that a displacement of the rotor causes an increase in magnitude of a magnetic flux induced by the rotor in one winding of the pair of windings and a decrease in magnitude of a magnetic flux induced by the rotor in the other winding of the pair of windings, and a driver adapted to operate in an active electromagnetic bearing mode in which the driver applies a suspension signal component to at least one winding of the pair of windings, which causes the magnetic field produced by the stator to have a component that exerts a suspension force on the rotor through interaction with the magnetic field emanating from the rotor;

the method comprising:

making the driver operate in a passive electromagnetic bearing mode instead of in the active electromagnetic bearing mode depending on at least one operational condition of the electric machine, whereby, in the passive electromagnetic bearing mode, the driver interconnects the pair of windings of the stator with each other so that the increase in magnitude of the magnetic flux in the one winding and the decrease in magnitude in the other winding of the pair of windings generates a suspension current in the pair of windings that causes the magnetic field produced by the stator to have a component that exerts a restoring force on the rotor counteracting the displacement.

* * * * *